US008576838B2

(12) United States Patent
Rey et al.

(10) Patent No.: US 8,576,838 B2
(45) Date of Patent: *Nov. 5, 2013

(54) METHOD OF SETTING UP A CALL-BACK

(75) Inventors: Jean-Francois Rey, Brest (FR); Stephane Coulon, Arronville (FR); Jacques Litteaut, Marly le Roy (FR)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,655

(22) Filed: Jun. 22, 2012

(65) Prior Publication Data
US 2012/0287825 A1 Nov. 15, 2012

Related U.S. Application Data
(63) Continuation of application No. 12/124,087, filed on May 20, 2008.

(30) Foreign Application Priority Data
Jun. 20, 2007 (EP) ..................................... 07290770

(51) Int. Cl.
H04L 12/66 (2006.01)

(52) U.S. Cl.
USPC ......................................................... 370/356

(58) Field of Classification Search
None
See application file for complete search history.

(56) References Cited

U.S. PATENT DOCUMENTS

| 7,089,310 | B1 | | 8/2006 | Ellerman et al. | |
|---|---|---|---|---|---|
| 7,221,739 | B1 | * | 5/2007 | Khan et al. | 379/88.13 |
| 7,313,525 | B1 | * | 12/2007 | Packingham et al. | 704/270 |
| 7,436,940 | B2 | * | 10/2008 | Adamczyk et al. | 379/88.18 |
| 2002/0160754 | A1 | * | 10/2002 | Alger et al. | 455/413 |

OTHER PUBLICATIONS

J. Davidson, J. Peters, M. Bhata, S. Kalidini and S. Mukherjee, Voice over IP Fundamentals, Second Edition, Jul. 27, 2006, pp. 1-24.*
K. Singh, A. Nambi, H. Schulzrinne, Integrating Voice XML with SIP services, pp. 1-5, International Conference on Communications, 2003, pp. 784-788.*
Daniel Amyot et al: "Combining VoiceXML with CCXML: A Comparitive Study" Consumer Communications and Networking Conference, 2007, CCNC 2007, 2007 4TH IEEE, PI, Jan. 2007, pp. 342-346, XP031087805.

(Continued)

*Primary Examiner* — John Blanton
*Assistant Examiner* — Christopher Crutchfield
(74) *Attorney, Agent, or Firm* — Harness, Dickey & Pierce

(57) ABSTRACT

The invention concerns a method of setting up a call-back to a caller in a packet-based telecommunications network, and a terminal and a media server to execute this method. The call-back is initiated by a user receiving a media stream. The user sets up a packet-based connection to a media server and receives the media stream from the media server. After choosing by the user to call back the caller, the media server generates a cookie with data defining a state of the media stream and sends the cookie to the user. The user initiates the call-back to the caller independently of the media server. After termination of the call-back, the data defining the state of the media stream are sent to the media server and are used to resume the transmission of the media stream to the user from a state following the state defined by the data.

10 Claims, 5 Drawing Sheets

(56) References Cited

OTHER PUBLICATIONS

Voxeo Inc.: "VoiceXML 2.1 Development Guide: Tutorial: Cookies and VoiceXML" Internet Citation, May 9, 2007, pp. 1-6, XP002463639.
Danielsen P J: "The Promise of a Voice-Enabled Web" Computer, IEEE Service Center, Los Alamitos, CA, US, vol. 33, No. 8, Aug. 1, 2000, pp. 104-106, XP000987575.
R. Sparks, RFC 3515—The Session Initiation Protocol Refer Method, Apr. 2003, pp. 1-24.
D. Burke, M. Scott, SIP Interface to VoiceXML Media Services, draft-ietf-mediactrl-vxml-00, Oct. 23, 2007, pp. 1-49.
D. Willis, B. Rosen, SIP Cookies, draft-willis-sip-cookies-00, Jul. 2001, pp. 1-10.

* cited by examiner

METHOD OF SETTING UP A CALL-BACK

The present invention is a continuation of U.S. application Ser. No. 12/124,087, filed on May 20, 2008, which is based on a priority application EP 07 290 770.2, filed on Jun. 20, 2007, both of which are hereby incorporated by reference in their entirety.

TECHNICAL FIELD

The present invention relates to a method of setting up a call-back to a caller in a packet-based telecommunications network, and a terminal and a media server to execute said method.

BACKGROUND OF THE INVENTION

When a user is dealing with a streaming media server (e.g., a voicemail server), he may decide to initiate an audio and/or video communication (call-back) with someone who left a message (caller). Some multimedia mail servers provide a facility where the streaming is interrupted and where the server initiates a communication with the caller on behalf of the user. When the user has finished the call-back, he comes back to the media server and may listen to the next message. With this approach, there are three technical problems. First, two media server ports are used while the user is having his real time communication (call-back to the caller). Second, signalling and sometimes media flows are hair-pinned through the media server. This may burden the network. Third, as the media server initiates a call on behalf of the user, there is usually inconsistencies in authentication (the media server does not know the user's password), display (the media server is calling the caller instead of the user is calling the caller), authorisation (the media server does not know the rules associated to the user), and reporting (billing, call-log).

FIG. 1 is a block diagram of a typical call-back situation according to prior art, illustrating the aforementioned drawbacks. FIG. 1a shows a user 10 connected to a media server 11. For example, the user 10 has called the media server 11 to listen to his telephone mailbox managed by the media server 11. The connection comprises a SIP dialogue 101 and a transmission of media streams 111 from the media server 11 to the user 10 (SIP=Session Initiation Protocol). After the media server 11 has replayed to the user 10 a voice message left by a caller 12, the media server 11 announces to the user 10 the instruction 1001: "Press 1 for calling this person back." When referring to a user 10 and a caller 12, we implicitly mean that the user 10 uses a user's terminal and the caller 12 uses a caller's terminal for establishing telecommunications connections.

FIG. 1b shows the successive situation after the user 10 has pressed the key "1" on his device. The media server 11 sends a SIP INVITE message 103 to the caller 12 for establishing a call-back to the caller 12. The connection between the user 10 and the media server 11, comprising a SIP dialogue 102 and a media stream 112, is maintained.

The successive situation has two alternatives: Either, cf. FIG. 1c1, all data exchange between the user 10 and the caller 12 are routed through the media server 11, i.e., both signalling traffic 104, 105 and media streams 114, 115 (Full hair-pinning). Or, cf. FIG. 1c2, only signalling traffic 106, 107 between the user 10 and the caller 12 is routed through the media server 11 whereas media streams 118 are sent on a direct way under avoidance of the media server 11 (Signalling hair-pinning). FIG. 1d shows a successive situation after the call-back to the caller 12 has been terminated. The connection between the user 10 and the media server 11, comprising a SIP dialogue 109 and a media stream 119, is maintained. The user 10 resumes to listen to the mailbox entries. For example, the media server 11 announces to the user 10 the instruction 1009: "Press 1 for deleting the message. Press 2 for listening to the next message."

FIG. 2 is a message flow diagram of a similar call-back situation according to prior art. This description focuses on the role of a media server with respect to a caller. It is implied that the conversation between the caller and a user is bridged by the media server. A user 20, called Alice, is subscriber to a corporate telecommunications network which is connected via a corporate SIP server 23 to a media server 21. The user 20 wants to listen to her telephone mailbox managed by the media server 21. The user 20 initiates a SIP session by sending a SIP INVITE message 201 addressed to her mailbox address "mymailbox@corporate.com" to the corporate SIP server 23. The corporate SIP server 23 forwards 202 the SIP INVITE message to the media server 21. The media server 21 replies to the corporate SIP server 23 with a "200 OK" message 203, which is forwarded 204 from the corporate SIP server 23 to the user 20. The "200 OK" message is acknowledged (ACK) 205 by the user 20. The ACK message is forwarded 206 from the corporate SIP server 23 to the media server 21.

A connection 207 for the exchange of RTP media streams is established between the user 20 and the media server 21 (RTP=Real-time Transport Protocol). The media server 21 announces to the user 20 the instruction 208: "Bob's message: 'Hello Alice! Blablabla.' To call back Bob, press 1. To listen to next message, press 2." Bob is the name of a caller 22 who has left a voicemail on the telephone mailbox of the user 20. The user 20 responds to this announcement 208 by pressing 209 the key "1" on her device. When referring to the user 20 and the caller 22, we implicitly mean that the user 20 uses a user's terminal and the caller 22 uses a caller's terminal for establishing telecommunications connections.

Triggered by the pressing of the key "1" on the user's 20 terminal, the media server 21 initiates a call-back SIP session with the caller 22 by sending a SIP INVITE message 210 addressed to the caller's 22 address "bob@corporate.com" to the corporate SIP server 23. The corporate SIP server 23 forwards 211 the SIP INVITE message to the caller 22. When the caller's 22 terminal, triggered by the INVITE message 210, 211, starts playing a ring tone, a 180 RINGING response 212, 213 is sent back, via the corporate SIP server 23, to the media server 21. On receipt of the 180 RINGING response, a UAC of the media server 21 is responsible to play a ring-back tone 214 at the media server 21 (UAC=User Agent Client).

Once the caller 22 picks up 215 the phone, the successful 200 OK response 216, 217 is sent from the caller 22 via the corporate SIP server 23 back to the media server 21 because the request is correctly processed. The 200 OK message 216, 217 is acknowledged (ACK) 218 by the media server 21, and the call is connected. Now the actual conversation 219 between the caller and the media server 21 is transmitted as data via RTP. The media server 21 bridges 220 the RTP flows to the user 20, and thus acts as a man-in-the middle between the user 20 and the caller 22. During the call-back to the caller 22, the media server 21 is a stateful media server 290. When the called party says "Good-bye" 221 and hangs up, a BYE request 222 is sent to the media server 21. The media server 21 responds with a 200 OK 223 to the caller 22.

After the call-back connection to the caller 22 has been terminated, the media stream transmission 224 from the media server 21 to the user 20 is resumed at a point where it had been interrupted for the set-up of the call-back to the caller 22. The media server 21 may resume the media stream 224 with the announcement 225: "Next message is from Charles: 'Hello Alice!'".

Moreover, when a user performs a call via internet using SIP (QSIG or H.323) then such a call will usually be stateless (QSIG=Q signalling). This has big drawbacks when the user would like to initiate a call-back to a caller after hearing some message left by that caller on the user's (audio/video) mail box.

Rosenberg, J., Lennox, J. and Schulzrinne, H., "Programming Internet Telephony Services", IEEE Internet Computing, Vol. 3, No. 3, 1999, pp. 63-72 (Tech-Report Number CUCS-010-99), describe a solution to achieve that a script related to a call persists so to allow to continue to interact with the server to process subsequent responses. It is achieved by defining a state token, called a script cookie, which is passed from the script to the server through a SIP CGI (=Common Gateway Interface) meta-header. When the script is re-executed at some later point, the server passes the cookie back to it through environment variables.

The currently best solution is for the server to act as man in the middle and renegotiate the media flows so that media ports of the media servers are free until the real-time communication. However, the media server still keeps a signalling context open; if there is a VXML interpreter, the context is still active as well (VXML=Voice Extensible Mark-up Language). As aforementioned, there is a way to prevent media hair-pinning. However if devices of the users and media server are separated by a Session Border Controller (=SBC), the SBC keeps contexts open as well. Another currently available solution is that there is proprietary information in the message initiated by the media server that can indicate on whose behalf the call is made. This is partly done by the OmniTouch® Unified Communication media server. However, this mechanism does not work in a multi-vendor environment and is complex in networks.

SUMMARY OF THE INVENTION

It is the object of the present invention to improve the set-up of a call-back by a user receiving a media stream.

The object of the present invention is achieved by a method of setting up a call-back to a caller in a packet-based telecommunications network, the call-back being initiated by a user receiving a media stream comprising data related to the caller, whereby the method comprises the steps of setting up by the user a packet-based connection to a media server and receiving the media stream from the media server, after choosing by the user to call back the caller, generating by the media server a cookie with data defining a state of the media stream and sending the cookie to the user, initiating by the user the call-back to the caller independently of the media server, and, after termination of the call-back, sending the data defining the state of the media stream to the media server or an associated media server and using the data defining the state of the media stream to resume the transmission of the media stream to the user from a state following the state defined by the data. The object of the present invention is further achieved by a terminal for setting up a call-back to a caller in a packet-based telecommunications network, the call-back being initiated by a user receiving a media stream comprising data related to the caller through the terminal, whereby the terminal is adapted to set up a packet-based connection to a media server and receive the media stream from the media server, receive, after choosing by the user to call back the caller, a cookie generated by the media server with data defining a state of the media stream, set up the call-back initiated by the user to the caller independently of the media server, and send, after termination of the call-back, the data defining the state of the media stream to the media server or an associated media server which uses the data defining the state of the media stream to resume the transmission of the media stream to the terminal from a state following the state defined by the data. Moreover, the object of the present invention is achieved by a media server for setting up a call-back to a caller in a packet-based telecommunications network, the call-back being initiated by a user receiving a media stream comprising data related to the caller, whereby the media server is adapted to send the media stream to the user via a packet-based connection set up by the user to the media server, generate, after choosing by the user to call back the caller, a cookie with data defining a state of the media stream and send the cookie to the user, receive, after termination of the call-back, the data defining the state of the media stream from the user and use the data defining the state of the media stream to resume the transmission of the media stream to the user from a state following the state defined by the data In information processing, a state is the complete set of properties transmitted by an object to an observer via one or more channels. Any change in the nature or quantity of such properties in a state is detected by an observer and thus a transmission of information occurs.

An information system or protocol that relies upon state is said to be stateful. One that does not is said to be stateless. For example, there are stateless firewalls and stateless servers, and HTTP is considered a stateless protocol (HTTP=Hypertext Transfer Protocol). A character encoding such as ISO 2022 is said to be stateful if the interpretation of a particular code value depends on the code values that came before it (ISO=International Organisation for Standardisation).

In comparison to the prior art cited above, the proposed idea differs by making the whole media server "call" stateless, i.e., the script logic and the SIP server. The state of the call is kept in another SIP server that deals with call processing, or is kept in the user's device if it supports the semantic associated with the cookie. The media server keeps no state since the state is in the cookie.

The design of the media server as a stateless server simplifies the server design because it does not need to dynamically allocate storage to deal with conversations in progress or worry about freeing it if a client dies in mid-transaction. Moreover, load balancing can be used.

Another advantage of the present invention is that there is no hair-pinning of signalling and/or media flows through the media server. In addition, the present invention provides an enhancement for mixing streaming and real-time sessions.

Moreover, the new real-time call to the caller, i.e., the call-back, is initiated by the user's device/terminal. Therefore, the real-time call is totally under control of the user.

Further advantages are achieved by the embodiments of the invention indicated by the dependent claims.

According to a preferred embodiment of the invention, the media server generates said cookie that relates to the state of the media stream when the user indicates that he wants to set-up a call-back to the caller. The generated cookie comprises data defining the state of the media stream and a VXML URL relating to an Interactive Voice Response (=IVR) script (URL=Uniform Resource Locator). The data defining the state of the media stream specifies the state of the media stream at a moment when the user requests the set-up of the call-back, i.e., at a moment when the transmission of the media stream from the media server to the user is suspended. The media server sends a SIP REFER message and the cookie to the user for initiation of a call transfer. The user receives the SIP REFER message and the cookie and stores the cookie for later usage.

After termination of the call-back by the user, the user sends a SIP INVITE message and the VXML URL to the media server or to the associated media server which is associated with the media server. After reception of the SIP INVITE message and the VXML URL, the media server or the associated media server loads the IVR script, retrieved and identified by means of the VXML URL, from a data base where the IVR script is stored. After loading the IVR script, the media server or the associated media server resumes the transmission of the media stream to the user beginning from the state of the media stream where the transmission of the media stream had been suspended before the call-back.

It is possible that the user reconnects, after termination of the call-back, to the media server or the associated media server with access to a data base where the media streams are stored as a VXML file. The user then transmits to the media server or the associated media server a VXML URL related to the media streams stored as the VXML file. The media server or the associated media server access the media streams stored as the VXML file by means of the VXML URL and send the media stream to the user from a state following the state defined by the cookie data.

Further, it is possible that the media server or the associated media server loads, after receipt of the cookie or state-related data from the user, a menu associated with the current state of the media stream.

According to another preferred embodiment of the invention, the SIP REFER message contains an indication that the user may call back the media server when the user has finished the call-back. This indication may be inserted as a parameter of the contact header of the SIP REFER message.

According to another preferred embodiment of the invention, the media server generates said cookie whereby the cookie comprises the data defining the state of the media stream and a SIP URL assigned to the media server or a SIP URL assigned to the associated media server. After finishing the call-back to the caller, the user uses said SIP URL as destination address for addressing packets to be sent to the media server or the associated media server.

In a preferred embodiment, the user sends the cookie back to the media server or the associated media server after termination of the call-back. After receipt of the cookie from the user, the media server or the associated media server leaves out an authentication of the user and/or an announcement to the user. This may be possible since the media server or the associated media server is informed by the cookie that the user had already earlier been connected to the media server with respect to the same media stream. As the user already has passed the authentication of the user or has heard the initial announcement, this part of the communication with the user can be skipped and the transmission of the media stream can be immediately resumed. Thus, the media server or the associated media server determined the state following the state defined by the data in the cookie based on the data in the cookie, i.e., the data defining the state of the media stream. Then, the media server or the associated media server resumes the transmission of the media stream to the user beginning from the retrieved state.

According to another preferred embodiment of the invention, the media server generates said cookie whereby the cookie comprises data defining the state of the media stream and a SIP URL assigned to the associated media server. The associated media server is adapted to resume the transmission of the suspended media stream without an authentication of the user and/or an announcement to the user. The initial media server whereto the user initially sets up a connection and which initially sends the media stream to the user performs an authentication procedure (e.g., input of a user PIN) and/or does an announcement to the user (e.g., explaining the function of keys on the keypad of the user's terminal during the connection to the mailbox). This initial media server is referred to as "media server" in this description.

There exists a second media server which is associated with the initial media server. This second media server is referred to as "associated media server" in this description. The associated media server may not be set up to perform an authentication or an announcement to the user. Therefore, the user will first establish a connection to the media server. Sometime during the transmission of the media stream, the user may decide to make a call-back while the transmission of the media stream is suspended. After the call-back, the user will want to resume the transmission of the media stream, e.g. to listen to the remaining messages in the mailbox left by other callers.

To establish a connection to the associated media server, the user will use the SIP URL assigned to the associated media server as destination address for messages indicating the wish to resume the transmission. For example, the user will address the SIP INVITE message with the SIP URL assigned to the associated media server and send the SIP INVITE message to the associated media server. After reception of the SIP INVITE message and the data defining the state of the media stream, the associated media server continues with the sending of the media stream from the point where the transmission had been suspended.

It is also possible that the address of the associated media server is not contained in the cookie received by the user from the media server. Instead, the user's terminal comprises a memory where the address of the associated media server is stored. The address of the media server, e.g., a telephone number assigned to a mailbox server, is stored within a memory of the user's terminal. Also the address of the associated media server, e.g., a telephone number assigned to another, associated mailbox server, is stored within the memory of the user's terminal. The user's terminal is set up to establish a connection with the media server and—after a call back of the user—to set up a connection to the associated media server according to the addresses stored in its memory. Preferably, the user presses a first key when he wants to listen initially to his mailbox and presses a second key when he wants to be re-connected to his mailbox after ending a call-back.

Furthermore, it is possible that the user is always connected to the media server. For example, the user has available only the address of the media server. The media server plays an announcement to the user which the user may skip when reaching a skip point, i.e., a specific point in this announcement, e.g., identified by a pause, etc., which allows the user to skip an already executed authorisation procedure and/or an information announcement. The media server may recognise whether the user has already been authorised to access the media stream, e.g., by an indication present in one or more data packets received from the user. When the user reaches the skip point, indicates that he wants to skip the announcement and has already been authorised, the user is de-connected from the media server and connected to the associated media server. After the user getting connected to the associated media server, the associated media server resumes the transmission of the suspended media stream to the user from a state of the media stream following the state defined by the data in the cookie.

Preferably, the user establishes, after termination of the call-back, a new connection to the media server or the associated media server. It is also possible that an in-between server connected both to the user and the media server or the associated media server establishes, after termination of the call-back, a new connection to the media server or the associated media server. This in-between server may be, e.g., a border control server of a corporate telephone network protecting the corporate telephone network against the insecure public packet-based telephone network, e.g., the Internet, or a server controlling a PBX network (PBX=Private Branch Exchange).

Preferably, the media server and/or the associated media server stays in an idle state during the call-back executed by the user. In other words, the media server and/or the associated media server keeps no state, its ports are free and it is not burdened.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF PREFERRED EMBODIMENTS

Figure 1:
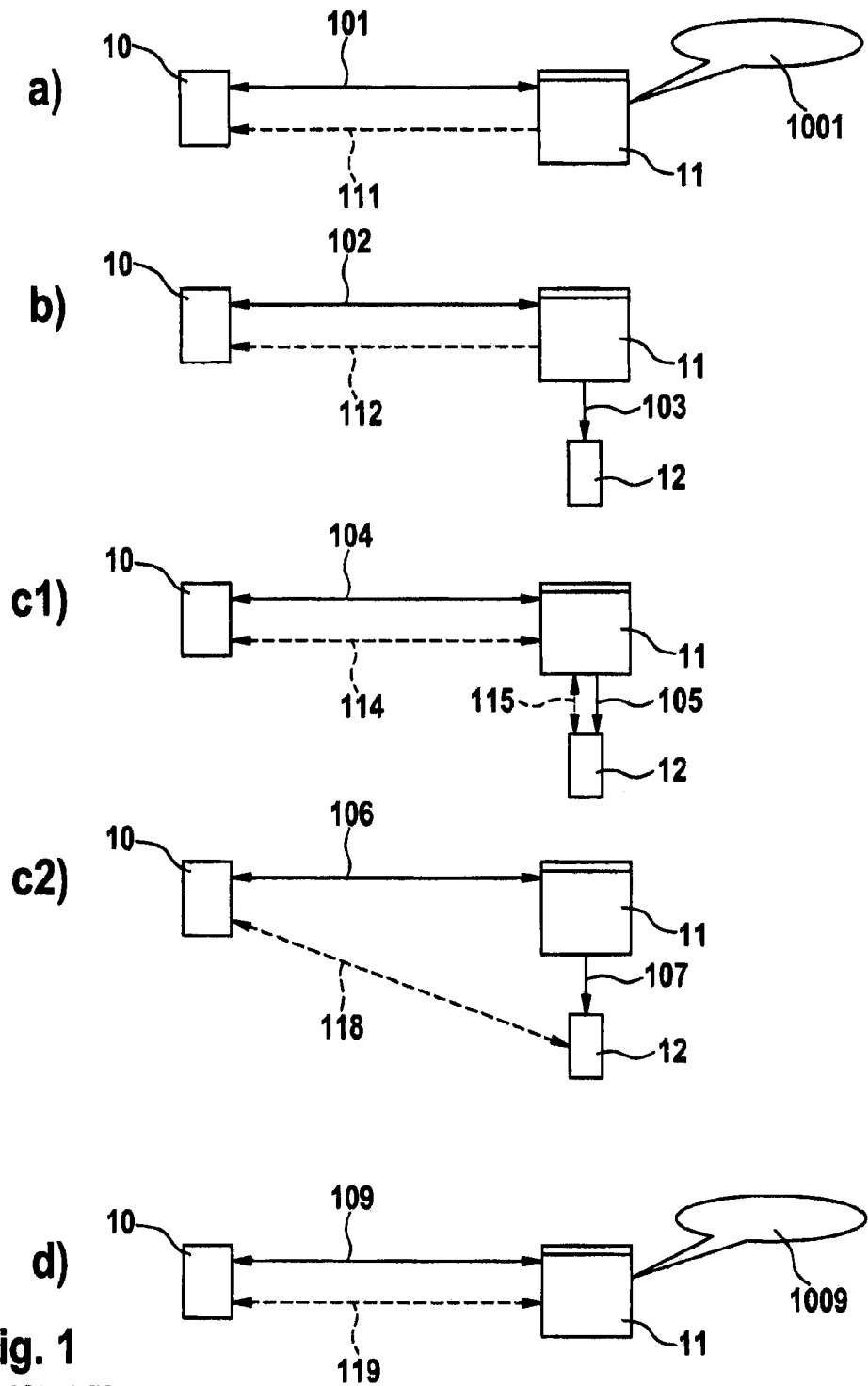
FIG. 1 is a block diagram of a typical call-back situation according to prior art.
Figure 2:
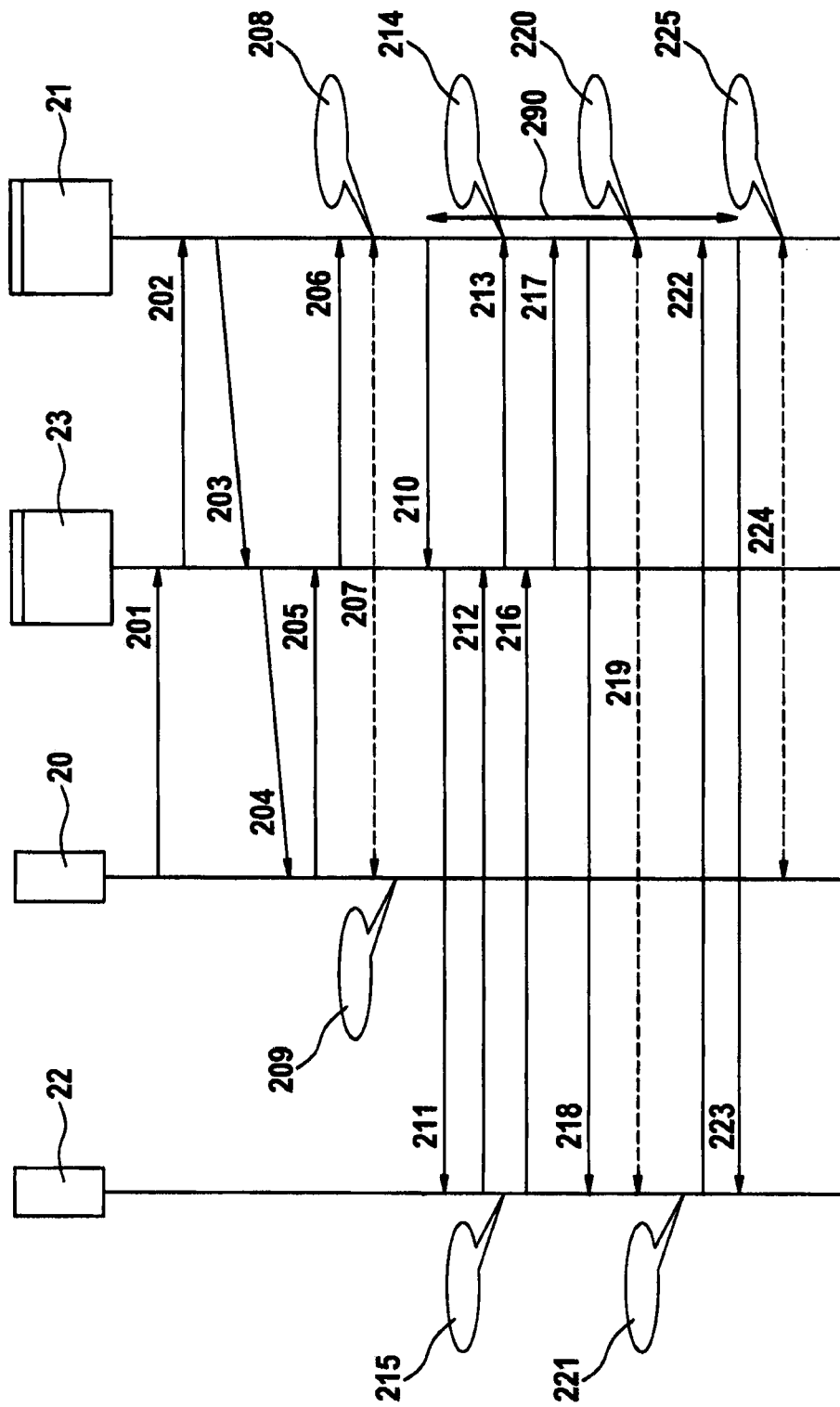
FIG. 2 is a message flow diagram of a similar call-back situation according to prior art.
Figure 3:
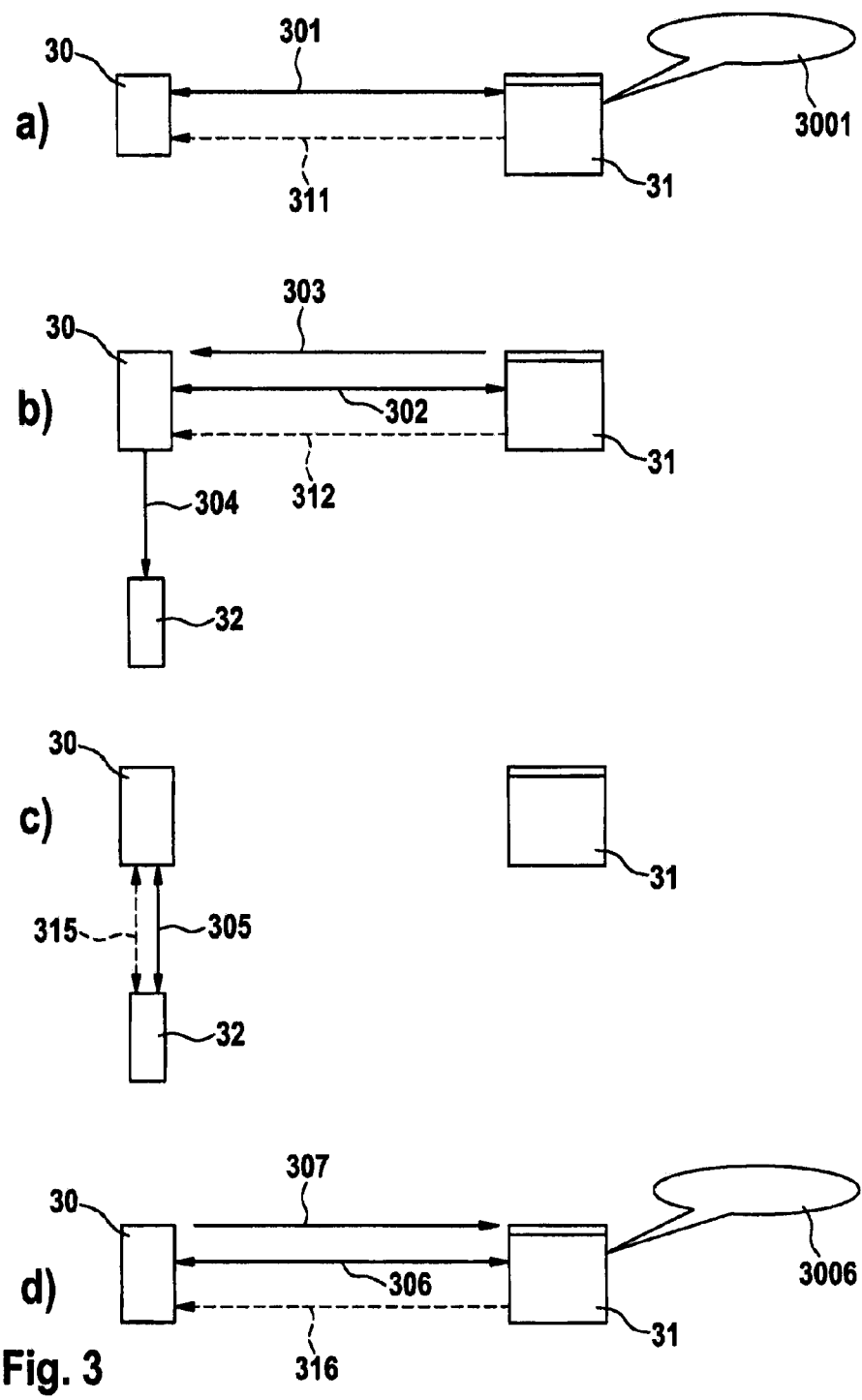
FIG. 3 is a block diagram of a call-back situation according to an embodiment of the present invention.

FIG. 3 is a block diagram of a typical call-back situation according to the present invention. This embodiment is based on SIP but other embodiments are possible with other protocols that support a single-step transfer (QSIG, H.323).

FIG. 3a shows a user 30 connected to a media server 31. The media server 31 is composed of one or several interlinked computers, i.e., a hardware platform, a software platform basing on the hardware platform and several application programs executed by the system platform formed by the software and hardware platform. The functionalities of the media server 31 are provided by the execution of these application programs. The application programs or a selected part of these application programs constitute a computer software product providing a call-back service as described in the following, when executed on the system platform. Further, such computer software product is constituted by a storage medium storing these application programs or said selected part of application programs.

Form a functional point of view, the media 31 server comprises an interface for communication with other network nodes or user terminals, e.g., for receiving and sending data and signalling packets, and a control unit for controlling the function of the media server 31 according to the present invention, e.g., for the generation of cookies.

For example, the user 30 has called the media server 31 to listen to his telephone mailbox managed by the media server 31. The connection comprises a SIP dialogue 301 and a transmission of a media stream 311 from the media server 31 to the user 30. The media stream 311 comprises information about calls which have not been answered by the user 30. The call-related information may comprise the address, e.g., a telephone number, of the caller, the name of the caller if the media server 31 has access to a correlation data base which allows to make a correlation between a caller's telephone number and a caller's name, the time when the call was received, and a recorded voice message of the caller (e.g., "Hi Alice! This is Bob. Please, call me back as soon as possible.").

After the media server 31 has replayed to the user 30 a voice message left by a caller 32, the media server 31 announces to the user 30 the instruction 3001: "Press 1 for calling this person back." When referring to a user 30 and a caller 32, we implicitly mean that the user 30 uses a user's terminal and the caller 32 uses a caller's terminal for establishing telecommunications connections.

The terminal used by the user 30 in a method according to the present invention may be any packet-enabled telecommunications terminal, e.g., a VoIP soft-phone or a mobile terminal for packet-based telecommunications (VoIP=Voice over Internet Protocol). The terminal comprises input means, output means, storage means, and a processor or a control unit interconnecting the aforementioned means and controlling the function and interaction of these means. The input means may comprise an interface for receiving packets from a communication partner via a telecommunications network, an alphanumerical keypad and a microphone; the output means may comprise an interface for sending packets to a destination or a communication partner via a telecommunications network, a LCD monitor and a loudspeaker; and the storage means may be a RAM memory (LCD=Liquid Crystal Display; RAM=Random Access Memory).

FIG. 3b shows the successive situation after the user 30 has pressed the key "1" on his device for indicating that he wants to call back the caller 32. Triggered by the call-back request of the user 30, the media server 31 generates a cookie that relates to its present state and the state of the media stream, respectively. The cookie may be a SIP URL assigned to the media server 31 with a VXML URL as a parameter that points to an Interactive Voice Response script.

The media server 31 sends a SIP REFER message 303 with the generated cookie to the user 30, via the still maintained connection between the user 30 and the media server 31, comprising a SIP dialogue 302 and a media stream 312. The REFER message 303 contains an indication that the user 30 may call back the media server 31 when it is done with the call-back. This indication may be inserted as a parameter of the Contact header of the SIP REFER message 303. The received cookie is stored in the memory of the user's 30 terminal for later use. The user 30 then calls the caller 32 for establishing the call-back by sending a SIP INVITE message 304 to the caller 32.

The successive situation, shown in FIG. 3c, is the call-back of the user 30 with the caller 32. The call-back between the user 30 and the caller 32 comprises a SIP dialogue 305 and a media stream 315. The media server 31 is idle during the call-back.

FIG. 3d shows a successive situation after the call-back to the caller 32 has been terminated. The user 30 re-establishes a SIP connection 306 to the media server 31 by sending a SIP INVITE message 307 and the cookie to the media server 31. The user 30 is able to call back the media server 31 thanks to the URL that was received with the cookie. The connection between the user 30 and the media server 31, comprising a SIP dialogue 306 and a media stream 316, is re-established. The media server 31 uses the data comprised in the cookie to determine the point/state of the mailbox content where the announcement is to be resumed.

The media server loads the VXML script and can move on to the other messages. Note that another media server can be used provided that it can access a common server where VXML documents are found. The media server 31 identifies a state of the media stream that is successive to the state of the media stream where the media stream had been interrupted for set-up of the call-back. The media server 31 resumes replaying the mailbox entries, beginning from said state, to the user 30. The user 30 resumes to listen to the mailbox entries. For example, the media server 31 announces to the user 30 the instruction 3006: "Press 1 for deleting the message. Press 2 for listening to the next message."

If the user 30 wants to listen to the next message(s), the user 30 may press the corresponding key. Then, the aforementioned steps (generation of cookie, transmission of cookie to user 30, call-back independently of media server 31, re-transmission of cookie to media server 31, re-establishment of media stream transmission) may be repeated one or more times in a corresponding way.

Figure 4:
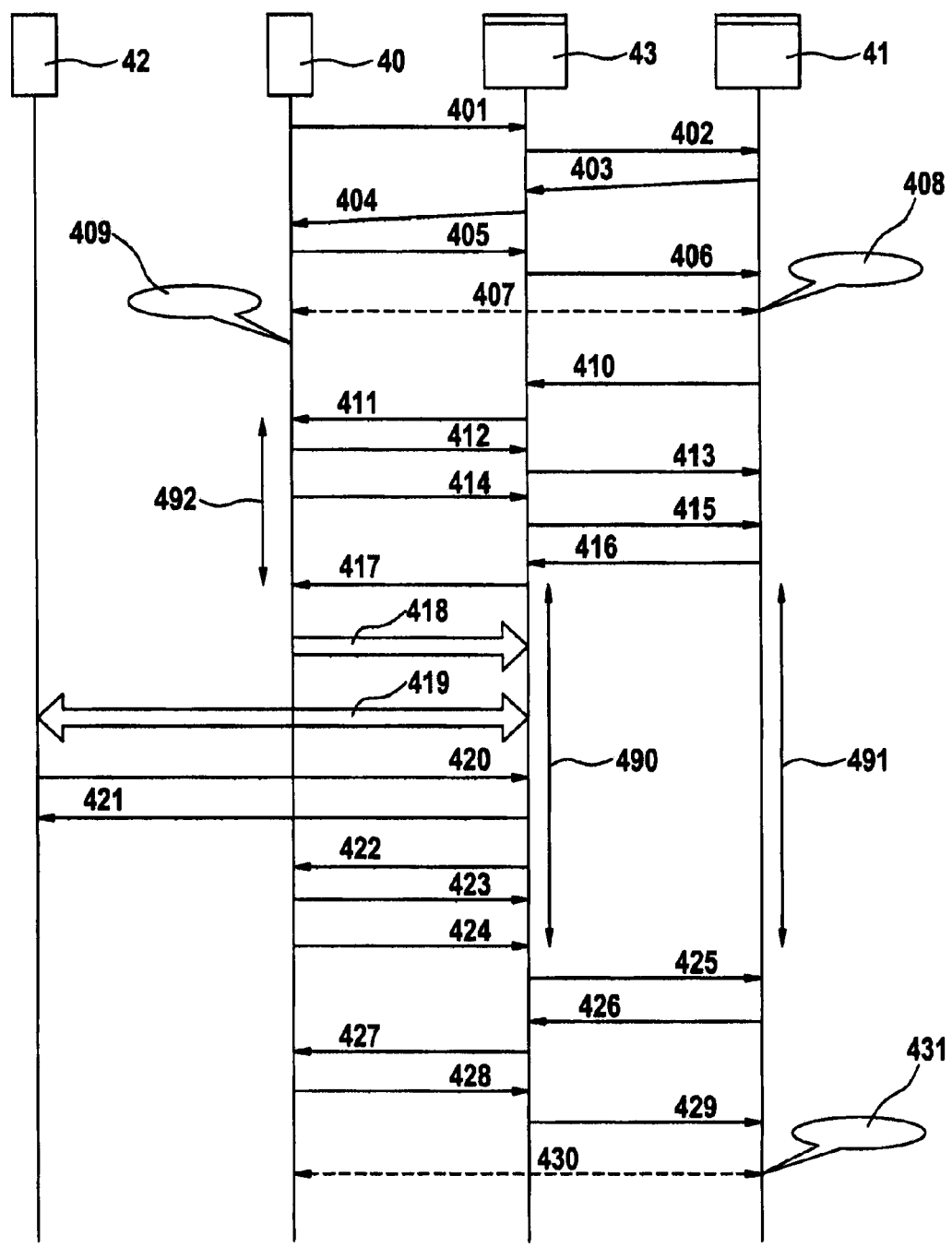
FIG. 4 is a message flow diagram of a call-back situation according to another embodiment of the present invention.

FIG. 4 is a message flow diagram of another call-back situation according to the present invention. A user 40, called Alice, is subscriber to a corporate telecommunications network which is connected via a corporate SIP server 43 to a media server 41. The user 40 wants to listen to her telephone mailbox managed by the media server 41. The user 40 initiates a SIP session by sending a SIP INVITE message 401 addressed to her mailbox address "mymailbox@corporate.com" to the corporate SIP server 43. The corporate SIP server 43 forwards 402 the SIP INVITE message to the media server 41. The media server 41 replies to the corporate SIP server 43 with a "200 OK" message 403, which is forwarded 404 from the corporate SIP server 43 to the user 40. The "200 OK" message is acknowledged (ACK) 405 by the user 40. The ACK message is forwarded 406 from the corporate SIP server 43 to the media server 41.

A connection 407 for the exchange of RTP media streams is established between the user 40 and the media server 41. The media server 41 announces to the user 40 the instruction 408: "Bob's message: 'Hello Alice! Blablabla.' To call back Bob, press 1. To listen to next message, press 2." Bob is the name of a caller 42 who has left a voicemail on the telephone mailbox of the user 40. The user 40 responds to this announcement 408 by pressing 409 the key "1" on her device. When referring to the user 40 and the caller 42, we implicitly mean that the user 40 uses a user's terminal and the caller 42 uses a caller's terminal for establishing telecommunications connections.

Triggered by the pressing of the key "1" on the user's 40 terminal, the media server 41 generates a token comprising data which define the current state of the media stream and sends a SIP REFER message 410 with the token to the corporate SIP server 43. The token is stored in a memory of the corporate SIP server 43. The token may be, e.g., a cookie. Preferably, the token is associated with a "call" semantic: "when the call is over, INVITE this URL". The semantic must be understood by an entity upstream, e.g., a call processing server (the corporate SIP server) or a calling device (the user's terminal).

The corporate SIP server 43 forwards 411 the SIP REFER message 410 to the user 40. The user 40 responds with a 200 OK message 412, 413 via the corporate SIP server 43 to the media server 41. Then, the user 40 sends a BYE message 414, 415 via the corporate SIP server 43 to the media server 41, to terminate the SIP session with the media server 41. The media server 41 replies with a 200 OK message 416, 417 via the corporate SIP server 43 to the user 40.

After terminating the session between the user 40 and the media server 41, the media server 41 is idle. The user 40 initiates a call-back 418, 419 to the caller 41 via the corporate SIP server 43. At the end of the call-back, the caller 42 sends a BYE message 420 to the corporate SIP server 43. The corporate SIP server 43 responds with a 200 OK message 421 to the caller 42.

To resume the transmission of the media stream data of the telephone mailbox operated in the media server 41 to the user 40, the corporate SIP server 43 sends a SIP REFER message 422 comprising the address "mymailbox@corporate.com" of the user's 40 mailbox and the token to the user 40. The user responds with a 200 OK message 423 to the corporate SIP server 43. The user 40 initiates a SIP session by sending a SIP INVITE message 424 addressed to her mailbox address "mymailbox@corporate.com" and the token to the corporate SIP server 43. The corporate SIP server 43 forwards 425 the SIP INVITE message and the token to the media server 41. The media server 41 replies to the corporate SIP server 43 with a "200 OK" message 426, which is forwarded 427 from the corporate SIP server 43 to the user 40. The "200 OK" message is acknowledged (ACK) 428 by the user 40. The ACK message is forwarded 429 from the corporate SIP server 43 to the media server 41.

A connection 430 for the exchange of RTP media streams is established between the user 40 and the media server 41. The media server 41 uses the information contained within the token to resume the transmission of the media stream from a state following the state of the media stream where the media stream was suspended for the set-up of the call-back. The media server 41 resumes the announcement and announces to the user 40 the instruction 431: "Next message is from Charles: 'Hello Alice!'".

During the entire call-back, the media server 41 may be called an idle media server 491. Since the token comprises data regarding the state of the media stream, the corporate SIP server 43 may be called a stateful server 490. Likewise, the user's 40 terminal receives information about the state of the media stream and thus may be called a stateful device 492.

Figure 5:
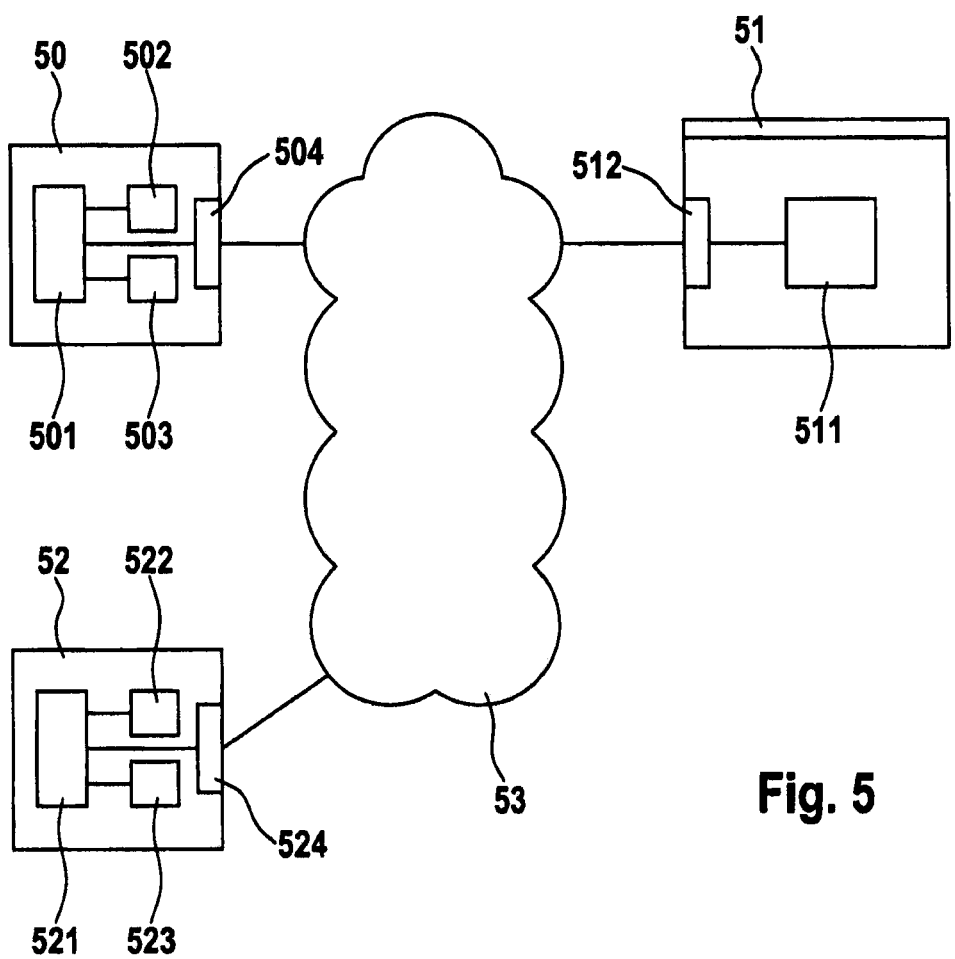
FIG. 5 is a block diagram detailing a terminal and a media server according to an embodiment of the present invention.

FIG. 5 shows a telecommunications network 53 providing a connection between a user terminal 50, a media server 51, and a caller terminal 52.

The user terminal 50 comprises a control unit 501, input means 502 (e.g., keypad, microphone), output means 503 (e.g., screen, loudspeaker), and an interface 504 to the telecommunications network 53. The control unit 501 is connected with the input means 502, the output means 503, and the interface 504. The control unit 501 controls the functions of the user terminal 50 and acts as central point and processing unit of the terminal 50.

The control unit 501 sets up a packet-based connection to the media server 51 via the interface 504, receives a media stream from the media server 51 via the interface 504, and controls the output of the media streams via the output means 503. A user of the terminal 50 indicates, e.g., by pressing a key on the input means 502, his wish to call back a caller on the caller terminal 52. The control unit 501 receives, via the interface 504, a cookie generated by the media server 51 and triggers the set-up of a call-back to the caller terminal 52. The control unit 502 sends, after termination of the call-back, the data defining the state of the media stream via the interface to the media server 51 or an associated media server.

The media server 51 comprises a control unit 511 and an interface 512 to the telecommunications network 53. The control unit 511 is connected with the interface 512. The control unit 511 controls the functions of the media server 51 and acts as a processing unit of the media server 51.

The control unit 511 sends the media stream to the user terminal 50 via the interface 512, generates the cookie and sends, via the interface 512, the cookie to the user terminal 50. After termination of the call-back, the control unit 511 receives via the interface 512 the data defining the state of the media stream from the user terminal 50 and uses those data to resume the transmission of the media stream to the user terminal 50 via the interface 512.

The caller terminal 52 comprises a central unit 521 for control of the terminal functions, input means 522, output means 523, and an interface 524 to the telecommunications network 53. The caller is indicated the call-back from the user terminal 50 via the output means 523 (e.g., a ringing tone). After the caller's acceptance of the call-back via the input means 522, e.g., by pressing a key on keypad, the caller terminal 52 receives the call-back via the interface 524. The control unit 521 receives the call-back content packets and signalling packets and controls their processing, e.g., the output of the call-back content packets to the caller. The caller indicates that he wishes to terminate the call-back via the input means 522 (e.g., by pressing a key on a keypad. This interaction triggers the control unit 521 to terminate the connection with the user terminal 50.

The invention claimed is:

1. A method of setting up a call-back to a caller in a packet-based telecommunications network, the call-back being initiated by a user receiving a media stream comprising data related to the caller, whereby the method comprises the steps of:
   setting up by the user a packet-based connection to a media server and receiving the media stream from the media server;
   after choosing by the user to call back the caller, generating by the media server a cookie with data defining a state of the media stream, and sending by the media server a signaling message and the cookie to the user for initiation of a call transfer;
   inserting an indication as a parameter of a contact header of the signaling message wherein the indication specifies that the user may call back the media server or the associated media server after termination of the call-back, the signaling message using a packet-based signaling protocol;
   initiating by the user the call-back to the caller independently of the media server; and
   after termination of the call-back, sending by the user an invitation message and the data defining the state of the media stream to the media server or an associated media server and using the data defining the state of the media stream to resume the transmission of the media stream to the user from a state following the state defined by the data.

2. The method of claim 1, wherein the method comprises the further steps of:
   generating by the media server said cookie, the cookie further comprising a VXML URL relating to an Interactive Voice Response script;
   after termination of the call-back, sending by the user the invitation message and the VXML URL to the media server or the associated media server; and
   loading by the media server or the associated media server the Interactive Voice Response script by means of the VXML URL for resuming the transmission of the media stream.

3. The method of claim 1, wherein the signaling message is a SIP REFER message.

4. The method of claim 1,
   wherein the method comprises the further steps of:
   generating by the media server said cookie, the cookie further comprising a SIP URL assigned to the media server or the associated media server; and
   addressing packets to be sent to the media server or the associated media server with said SIP URL.

5. The method of claim 1,
   wherein the method comprises the further steps of:
   after termination of the call-back, sending by the user the cookie back to the media server or the associated media server;
   after receipt of the cookie from the user, skipping by the media server or the associated media server an authentication of the user and/or an announcement;
   retrieving, by the media server or the associated media server, the state following the state defined by the data in the cookie based on the data in the cookie; and
   resuming the transmission of the media stream to the user from the retrieved state.

6. The method of claim 1,
   wherein the method comprises the further steps of:
   generating by the media server said cookie, the cookie further comprising a SIP URL assigned to the associated media server whereby the associated media server is adapted to resume the transmission of the media stream without an authentication of the user and/or an announcement; and
   addressing packets to be sent by the user for resuming the transmission of the media stream with said SIP URL assigned to the associated media server.

7. The method of claim 1,
   wherein the method comprises the further step of:
   after termination of the call-back, establishing a new connection to the media server or the associated media server from the user or from an in-between server connected both to the user and the media server or the associated media server.

8. The method of claim 1,
   wherein the method comprises the further step of:
   keeping the media server and/or the associated media server in an idle state during the call-back.

9. A terminal for setting up a call-back to a caller in a packet-based telecommunications network, the call-back being initiated by a user receiving a media stream comprising data related to the caller through the terminal, whereby the terminal comprises a control unit adapted to set up a packet-based connection to a media server and receive the media stream from the media server, receive, after choosing by the user to call back the caller, a cookie, generated by the media server with data defining a state of the media stream, and a signaling message, the signaling message using a packet-based signaling protocol and including an indication as a parameter of a contact header that specifies that the user may call back the media server or the associated media server after termination of the call-back, set up the call-back initiated by the user to the caller independently of the media server, and send, after termination of the call-back, an invitation message and the data defining the state of the media stream to the media server or an associated media server which uses the data defining the state of the media stream to resume the transmission of the media stream to the terminal from a state following the state defined by the data.

10. A media server for setting up a call-back to a caller in a packet-based telecommunications network, the call-back being initiated by a user receiving a media stream comprising data related to the caller, whereby the media server comprises a control unit adapted to send the media stream to the user via a packet-based connection set up by the user to the media server, generate, after choosing by the user to call back the caller, a cookie with data defining a state of the media stream and send the cookie and a signaling message to the user, the signaling message using a packet-based signaling protocol and including an indication as a parameter of a contact header that specifies that the user may call back the media server or the associated media server after termination of the call-back, receive, after termination of the call-back, an invitation message and the data defining the state of the media stream from the user and use the data defining the state of the media stream to resume the transmission of the media stream to the user from a state following the state defined by the data.

* * * * *